June 21, 1932.  A. H. BYFIELD  1,863,712
HEATING SYSTEM
Filed July 14, 1930   2 Sheets-Sheet 1
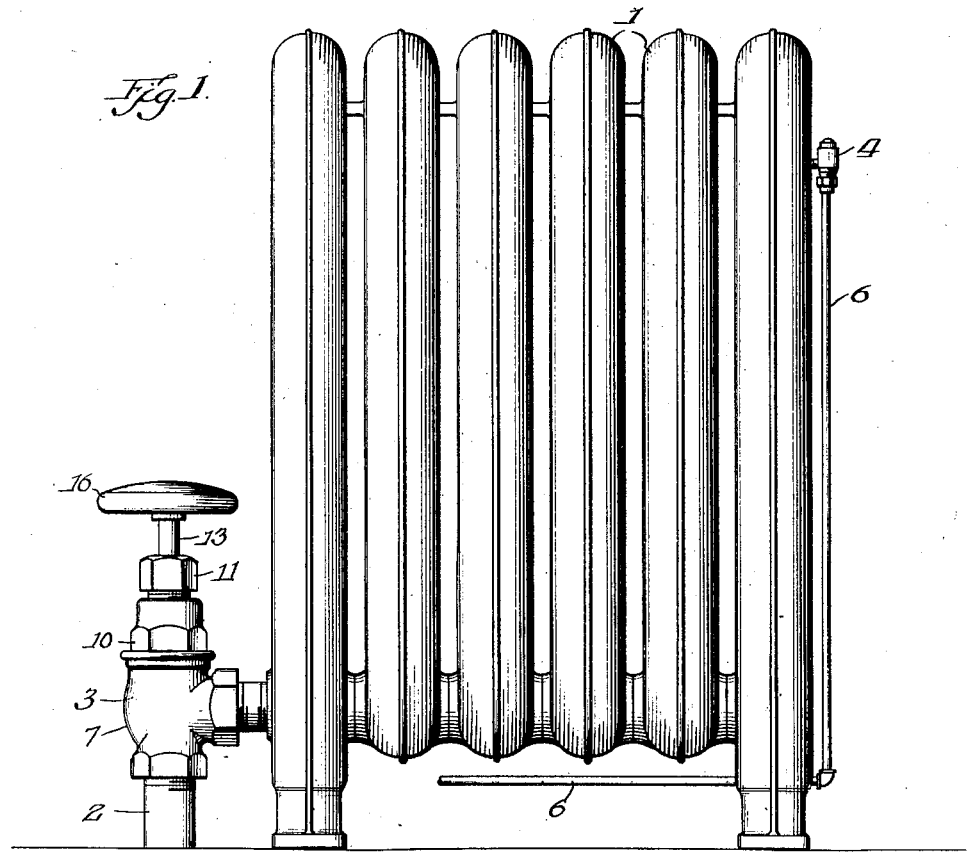
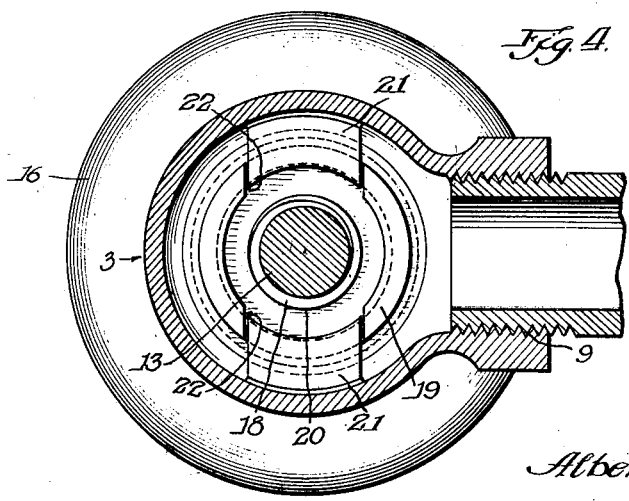

June 21, 1932.   A. H. BYFIELD   1,863,712
HEATING SYSTEM
Filed July 14, 1930    2 Sheets-Sheet 2
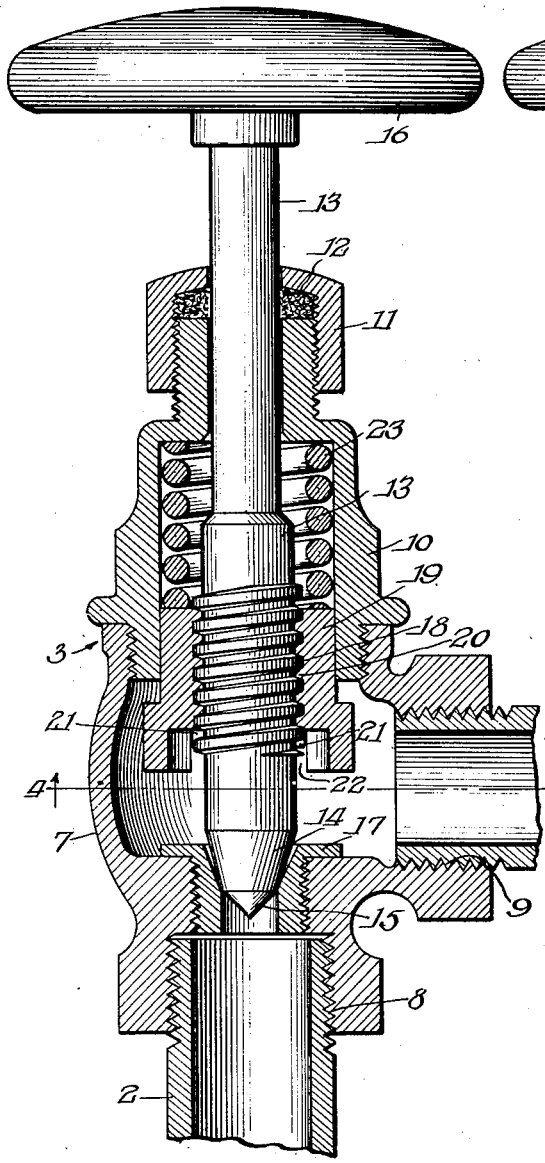
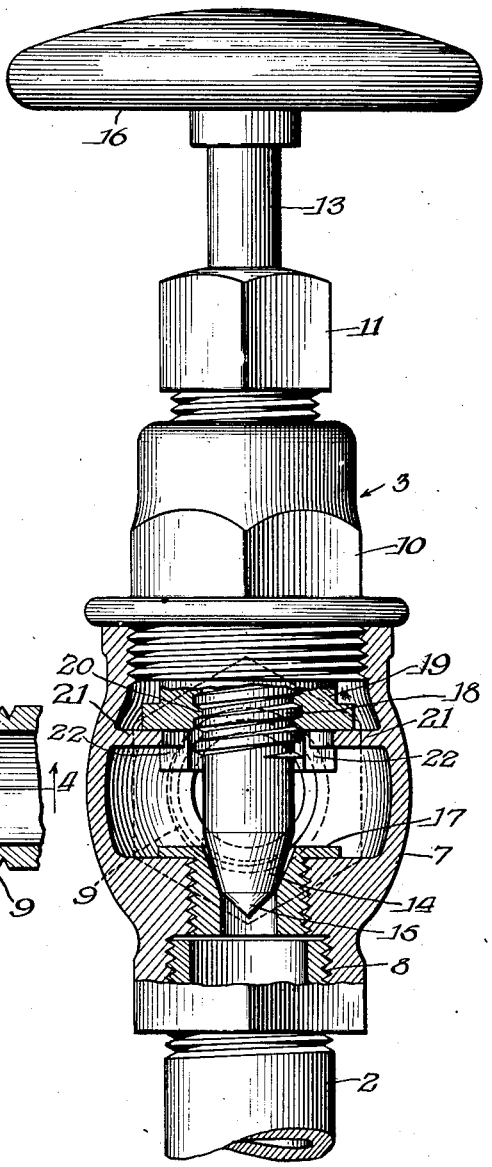
Inventor:
Albert H. Byfield.
By Wilson, Dowell, McCanna & Rehm
Attys Patented June 21, 1932

1,863,712

UNITED STATES PATENT OFFICE

ALBERT H. BYFIELD, OF CHICAGO, ILLINOIS

HEATING SYSTEM

Application filed July 14, 1930. Serial No. 467,676.

My invention relates to valves and aims to provide a valve which when used in a heating system will permit close and accurate regulation of the heating medium supplied to a radiator in the system. It will of course be manifest that my invention may be applied to other purposes although it was particularly conceived and designed to be used in heating systems in combination with steam radiators.

It is well recognized that it is very difficult and to date practically impossible to heat rooms of relatively small dimensions in a proper or comfortable manner. For instance, it is practically impossible to heat and to control the temperature satisfactorily of an average sized room in a hotel or apartment during all climatic conditions. This is due primarily to the lack of proper control of the heating medium in the radiators, i. e. there is no close regulation of the flow of steam or other heating medium therethrough. The valves generally employed for this purpose are of the globe valve type and accordingly when in open position permit too great a flow through the valve and consequently cause overheating of the room except under very low temperature conditions. Many other types of valves and systems have been experimented with and applied to heating systems in vain attempts to accurately control the flow of heating medium therethrough.

It is the purpose of my invention therefore to provide a valve particularly applicable in a heating system and which in combination with a radiator, particularly a steam radiator, will permit of accurate adjustment and control of the heating medium flowing through the radiator and thus provide for proper temperature regulation of even a small room under widely varying temperatures.

I have discovered that it is essential to have very close regulation, i. e. accurate adjustment of the flow of heating medium through the radiator in order to control the temperature of a relatively small room. I have also discovered that it is particularly necessary to provide for accurate adjustment and regulation of the flow of heating medium, usually steam, when the medium is being admitted to the radiator in small amounts. This latter condition arises particularly when heating small rooms or when heating in the springtime and fall. At these periods when the temperature is not very low the heating problems are particularly difficult.

In accordance with my invention I incorporate in the heating system a radiator and a control valve in which the closure element has a long tapered seating element cooperative with a similarly long tapered seating member arranged to receive said seating element. I also preferably employ a self-grinding valve of the above type whereby the seat and valve are always maintained in proper condition to provide for accurate adjustment of the valve. Furthermore I preferably use a long tapering valve in which the contacting portions of the valve closure member and seat member are provided with slightly different tapers. This construction aids in securing a more perfect seating of the valve over a long period of life due to the fact that the actual seating surface is relatively small without diminishing the accurate control. This latter feature also prevents so-called wire drawing and reduces the noise of the valve when adjusted in partially closed condition.

Other objects and advantages of my valve will be appreciated from the following description given in connection with the drawings, in which:

Fig. 1 is a side elevation of a radiator and valve constructed and combined in accordance with my invention.

Fig. 2 is a vertical section through the center of a valve constructed in accordance with my invention.

Fig. 3 is an end elevation partly in section of a valve constructed in accordance with my invention, and Fig. 4 is a section on line 4—4 of Fig. 2.

Referring to the drawings and more particularly to Fig. 1, I have illustrated a portion of a heating system showing a standard steam radiator denoted by the reference character 1 which is supplied with a heating medium such as steam through an inlet pipe 2 and valve 3, the latter being constructed in accordance with my invention and to be hereafter described. The usual trap or valve 4 is applied to one end of the radiator and is drained by return connection 6.

Referring more particularly to Figs. 2, 3, and 4 it will be seen that my valve, illustrated as an angle valve, comprises a body or casing 7 having an internally threaded inlet 8 adapted to be connected to the source of heating supply and an internally threaded outlet 9 adapted to be connected to a radiator. To the upper end of the body portion is threadedly secured a recessed bonnet 10, the upper end of which is threaded externally in the usual manner to receive a stuffing nut 11 which serves to compress the packing 12 around the valve stem 13 where it passes through the bonnet.

The closure member of the valve comprises the stem 13, one end of which is formed into a relatively long tapered seat portion 14 which terminates in a pilot tapered portion 15. The upper end of the stem is provided with a mushroom wheel or handle 16 by means of which the valve may be opened or closed. The tapered seat portion 14 is of the proper diameter and is arranged to seat within a centrally apertured removable seat member 17 arranged coaxially with said stem. To permit ready replacement the seat member is made removable by threading it to the body. The annular side wall of the tapered aperture of seat 17 is of slightly greater inclination with respect to the vertical axis than the taper of the seating portion 14 of stem 13.

The difference in taper between the portion 14 of the stem and the bore of the valve seat serves to create a line contact between the closure member and the seating member and yet maintain small clearances between the closure and seating members during opening and closing movements of the same. These small clearances and possible gradual opening and closing movements permit of accurate control and regulation of the valve. By maintaining a line contact rather than a large surface contact wire drawing is prevented and furthermore the continued perfect seating of the valve is assured. This is readily understood since it is necessary only to seat upon a small surface area approaching that of a line rather than a relatively large annular wall surface. Intermediate its ends the stem 13 is threaded as at 18 to engage a sleeve-like stem guide 19 having its interior bore threaded as at 20.

The guide is fitted within the bonnet member for non-rotative sliding vertical movement. To prevent rotation the body member is provided with a pair of inwardly projecting diametrically opposed lugs 21 which engage in diametrically opposed slots 22 formed in the lower end of the guide member 19 and thus permit limited vertical movement of the guide member but prevent rotary movement thereof. A compression spring 23 disposed within the interior bore of the bonnet between the upper surface thereof and the upper surface of guide member 19, tends to urge the stem guide 19 downwardly to its lower vertical limit at all times.

It follows that continued rotation of valve stem 13, by means of hand wheel 16, after the tapered portion 14 has seated against seat member 17 will cause the guide 19 to move vertically upward against the compression of spring 23. This movement will permit the continued rotation of the stem 13 and will accordingly permit the seating portion 14 to be ground upon the seat 17. The valve is therefore what may be termed a self-grinding valve in that the closure member can be rotatively ground relatively to the seat member while in place and in operative service.

From the foregoing it is believed to be apparent that by incorporating a valve of my construction in a heating system to control the flow of steam through a radiator therein, accurate regulation may be obtained of the heating medium flowing through the radiator regardless of the degree of opening of the valve. The temperature of the radiator may therefore be closely controlled to the extent of having any desired number of sections or coils of a radiator heated. The temperature of relatively small rooms may therefore be regulated to suit personal comfort under widely varying climatic conditions.

As I have heretofore pointed out, it is manifest that a valve constructed in accordance with my invention may be utilized in other fields although it is particularly beneficial in the combination described.

It is also obvious that minor changes may be made in the details of construction without departing from the spirit and scope of my invention as defined in the claims appended hereto.

I claim:

1. The combination of a heating radiator with a control valve connected thereto for controlling the flow of heating medium through said radiator, said valve having a relatively long tapering closure member and a correspondingly long tapering seat member and means for moving said closure member toward and from said seat member, said means including low pitch threads for imparting relatively slow and gradual axial movement to said closure member whereby accurate control and regulation of the flow of heating medium through said valve and radiator may be accomplished.

2. The combination of a heating radiator with a control valve connected thereto for controlling the flow of heating medium through said radiator, said valve having a relatively long tapering closure member and a correspondingly long tapering seat member whereby accurate control and regulation of the flow of heating medium through said valve and radiator may be accomplished and means for permitting rotation of said closure member relative to said seat member while in closed position.

3. The combination of a heating radiator with a control valve connected thereto for controlling the flow of heating medium through said radiator, said valve having a relatively long tapering closure member and a correspondingly long tapering seat member whereby accurate control and regulation of the flow of heating medium through said valve and radiator may be accomplished, the taper of said closure member and said seat member being sufficiently different to create a substantially line contact between said members.

In witness of the foregoing I affix my signature.

ALBERT H. BYFIELD.